(12) United States Patent
Duke et al.

(10) Patent No.: US 7,708,939 B2
(45) Date of Patent: May 4, 2010

(54) COOLING WATER CORROSION INHIBITION METHOD

(75) Inventors: Dan A. Duke, Temecula, CA (US); John L. Kubis, Mission Viejo, CA (US)

(73) Assignee: Water Conservation Technology International, Inc., Temecula, CA (US)

( * ) Notice: Subject to any disclaimer, the term of this patent is extended or adjusted under 35 U.S.C. 154(b) by 461 days.

(21) Appl. No.: 11/789,198

(22) Filed: Apr. 24, 2007

(65) Prior Publication Data

US 2008/0264870 A1 Oct. 30, 2008

(51) Int. Cl.
*C23F 11/06* (2006.01)
*C23F 11/14* (2006.01)

(52) U.S. Cl. .................. 422/13; 210/698; 422/16; 422/18; 252/390

(58) Field of Classification Search .................. 422/13
See application file for complete search history.

(56) References Cited

U.S. PATENT DOCUMENTS

| | | | | |
|---|---|---|---|---|
| 4,098,720 A | * | 7/1978 | Hwa | 252/389.3 |
| 4,149,969 A | * | 4/1979 | Robitaille et al. | 252/181 |
| 4,678,638 A | * | 7/1987 | Outlaw et al. | 422/13 |
| 5,194,223 A | * | 3/1993 | Moulton et al. | 422/16 |
| 5,277,823 A | | 1/1994 | Hann et al. | |
| 5,403,521 A | | 4/1995 | Takahashi | |
| 5,746,947 A | * | 5/1998 | Vanderpool et al. | 252/394 |
| 5,985,152 A | * | 11/1999 | Otaka et al. | 210/668 |
| 6,103,144 A | * | 8/2000 | Cheng | 252/394 |
| 6,315,909 B1 | | 11/2001 | Hoots et al. | |
| 6,334,955 B1 | | 1/2002 | Kawashima et al. | |
| 6,402,957 B1 | | 6/2002 | Boyce | |
| 6,468,470 B1 | | 10/2002 | Oldsberg et al. | |
| 6,537,456 B2 | | 3/2003 | Mukhopadhyay | |
| 6,733,636 B1 | | 5/2004 | Heins | |
| 6,929,749 B2 | | 8/2005 | Duke et al. | |
| 6,949,193 B2 | | 9/2005 | Duke et al. | |
| 6,998,092 B2 | | 2/2006 | Duke et al. | |
| 7,122,148 B2 | | 10/2006 | Duke et al. | |

FOREIGN PATENT DOCUMENTS

WO  WO 9705228  2/1997

OTHER PUBLICATIONS

Iler, R K, The Chemistry of Silica, 1979 Wiley, pp. 4-6, 10-15, 22-23, 30-31, 40-43, 46-51, 54-55, 74-75, 82-89, 92-93, 116-117, 124-145, 160-163, 174-177, 188-189, 194-197, 204-205, 212-215, 218-219, 312-317, 324-325, 354-361, 366-369, 374-377, 554-559.

Incopini, G A, Kinetics of Silica Oligomerization and Nanocolloid Formation as a Function of pH and Ionic Strength at 25o C, Penn State U., Dept of Geosciences, pub. Geochimica Et Cosmochimica ACTA, vol. 69, No. 2, pp. 293-303 (2005).

Icenhower, J P, The Dissolution Kinetics of Amorphous Silica in Sodium Chloride Solution: Effects of temperature & Ionic Strength, Geochimica Et Cosmochimica ACTA vol. 64 (24), pp. 4193-4203 (2000).

Klein, R, Charge Stabilized Colloidal Suspensions, Pure Applied Chem., vol. 73, No. 11, pp. 1705-1719, (2001).

Grier, D G, Interactions and Dynamics in Charge-Stabilized Colloid, MRS Bulletin 23, pp. 24-31 (1998).

Kallay, N, Introduction of the Surface Complexation Model into the Theory of Colloid Stability, Croatia Chemica ACTA, CCACAA 74 (3) pp. 479-497 (2001).

Kirby, B J, Zeta Potential of Microfluidic Substrates, Electrophoresis 2004, 25, pp. 187-202.

Barr, T L, U. Wisconsin-Milwaukee, Modification and Characterization of Mineralization Surface for Corrosion Protection, (www.elisha.com/docs/CorrosionProtection.pdf, Jan. 2006 dl).

Mauritz, K, Sol Gel Chemistry, U. Southern Mississippi, School of Polymers, (www.psrc.usm.edu/mauritz/solgel.html, Jan. 2006 dl).

Gillet, S L, Toward a Silicate-Based Molecular Nanotechnology I, Mackay School of Mines, U. Nevada Reno (1998), (www.foresight.org/conference/MNT05/Papers/Gillet1/Index.html, Jan. 2006 dl).

Gillet, S L, Toward a Silicate-Based Molecular Nanotechnology II, Mackay School of Mines, U. Nevada Reno (1998), www.foresight.org/conference/MNT05/Papers/Gillet2/Index.html, Jan. 2006 dl).

(Continued)

*Primary Examiner*—Peter A Hruskoci
(74) *Attorney, Agent, or Firm*—Stetina Brunda Garred & Brucker

(57) ABSTRACT

A method of providing corrosion inhibition to copper, nickel, aluminum, zinc, tin, lead, beryllium, carbon steel, various alloys of such metals, and galvanized coatings in evaporative cooling water applications approaching zero liquid discharge that are specifically attacked by cooling water with residuals of corrosive chemistry or ions such as ammonia/ammonium ion, chloride, high TDS, OH$^-$, or high pH. The method includes applying azoles inhibitors (such as TTA, BTA, etc.) at residuals of 0.25 mg/L to 200 mg/L or greater (as azoles) to the cooling water application and operating with a combination of high TDS (greater than 2500 mg/L) and high pH (greater than 9.0), while maintaining low total hardness (less than 200 mg/L as $CaCO_3$).

17 Claims, No Drawings

OTHER PUBLICATIONS

U. of Aberdeen, UK, Silicification in Hot Spring Environments, Learning Resource Site, (www.abdn.uc.uk/rhynie/sinter.htm#silici, Jan. 2006 dl).

Stumm, et al.; "Formation of Polysilicates as Determined by Coagulation Effects"; Environmental Science and Technology; 1967; Vo. 1, 221-227.

Small, R.J., et al., "Using a buffered rinse solution to minimize metal contamination after wafer cleaning", Ultrapure Materials—Chemicals, Micro Magazine.com.

Rozenfeld, I.L.; "Corrosion Inhibitors"; 1981; McGraw Hill; 171-174.

The NALCO Water Handbook; 1979; Chapter 3, p. 14 and 16.

Drew; Principles of Industrial Water Treatment; Sixth Edition; 1983; Chapter 3, pp. 43 and 64.

Boffardi, Bennett P., PhD; Calgon Internal Publication; 1988; Chapter 4; pp. 30-31.

Atkinson, J.M., et al.; "Cathodic delamination of methylmethacrylate-based dry film polymers on copper"; IBM Jour.Res. Develop., vol. 29 No. 1, Jan. 1985, p. 29.

Tuthill, A.H., "Experience with copper alloy tubing, waterboxes and piping in MSF desalination plants", Oct. 6, 1997, vol. 1, Sessions 1-3, p. 1-22.

Metikos-Hukovic, et al., "Copper corrosion at various pH values with and without the inhibitor", May 7, 1999, Journal of Applied Electrochemistry 30; 617-624, 2000.

White Rust; An industry update of guide paper, 2002, Association of Water Technologies; p. 1-14.

* cited by examiner

COOLING WATER CORROSION INHIBITION METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND

This invention is directed toward corrosion inhibition in evaporative cooling water applications. More particularly, this invention is directed toward the use of azoles inhibitors in combination with high Total Dissolved Solids (TDS), high pH, and low total hardness.

With respect to the inhibition of corrosion for metals benefiting from the discoveries disclosed herein, the most common examples cited are copper and copper alloys because of their good thermal and workability properties for heat transfer and fabrication, and their inherent properties for biofouling resistance and corrosion resistant oxide formation under water chemistry conditions addressed by prior art applications. More specifically, these discoveries focus on corrosion inhibitor performance in water chemistry conditions that are the result of evaporative cooling water systems that operate with water chemistry approaching Zero Liquid Discharge (ZLD) in order to conserve water and reduce environmental discharge impact, such as permitted by corrosion and scale inhibition methods recently disclosed by Duke, et al. in U.S. Pat. Nos. 6,929,749; 6,940,193; 6,998,092; and 7,122,148, all of which are herein expressly incorporated by reference. Such method water chemistry may approach or exceed seawater TDS concentration, but seawater applications are typically pH neutral (pH 7.4 to 8.7 in evaporative cooling water) and also contain high hardness concentrations in evaporative cooling water applications.

Corrosive attack of copper by ammonia in water is well known in the water treatment industry, and presents a particular challenge to reuse of wastewater sources that contain ammonia in cooling water systems that use copper and other metals and alloys which are vulnerable to ammonia. Ammonia and ammonium ion are reported to exist in equilibrium as both the ammonium ion and ammonia gas in the pH 7 to 11 range. The equilibrium shifts toward increased ammonium ion concentration as pH approaches 7 and to increased ammonia gas concentration as pH approaches 11. Ammonia gas is volatilized from water by heat, pH elevation and circulating over a cooling tower, typical of ammonia stripper design. With cooling water pH control at greater than pH 9, total ammonia/ammonium ion residuals will be reduced to lower ranges by such tower stripping. Dilute aqueous concentrations of ammonia/ammonium ion (less than 200 mg/L as $NH_4^+$) are easily measured by such procedures as Chemetrics test procedure K-1500 which converts and measures the total residual as ammonium ion.

Relative to seawater (high TDS), as reported by Tuthill et al. in *Experience with Copper Alloy Tubing, Waterboxes and Piping in MSF Desalination Plants*, IDA World Congress on Desalination and Water Reuse, Volume I, Sessions 1 to 3, October 1997, Madrid, Spain, the corrosion resistance of copper nickel alloys depends upon formation of a protective film. Film formation is referred to sometimes as "passivation". Film formation is affected by pH, time, aeration, velocity, temperature, pollution and other factors. There is generally an inner cuprous oxide film, $Cu_2O$, and an outer cupric oxide, CuO, film. Although cuprous oxides and cupric oxides are the principal components of the films, the lattice usually includes other metallic ions, including iron, nickel, aluminum, calcium, sometimes silicon and other species. Principal anions include chlorides, hydroxides, carbonates, bicarbonates and oxides. There is no fixed composition in these films.

Tuthill also reports that time is a major factor in film formation and also in the degree of protection the film affords. Tuthill referred to studies that have shown that corrosion rates of copper nickel alloys in seawater may gradually decrease over time for periods up to 7 years, with example corrosion rate data for C70600 reduced from approximately 1.9 mpy to about 0.6 mpy over that time frame. Temperature also has a major influence on the rate of film formation. At higher temperatures the film forms and matures faster. At lower temperatures, the film forms and matures more slowly. Another major factor influencing film formation is pH. Tuthill referred to studies that reported on film formation for C70600, C71500 and C68700 alloys in seawater found no film formation below pH 6. The unfilmed corrosion rates were high, of the order of 35 mpy (0.89 mm/yr.). At higher pH, corrosion rates for these metals were reported to be lower at normal rates for seawater. Tuthill also reported corrosion rates for these three copper tubing alloys in seawater systems, depending on chlorination practices, varied from less than 1 mpy to 3.2 mpy. Corrosion behavior in fresh, brackish and higher salinity waters is quite similar to performance in seawater.

Tuthill also reports that ammonia is sometimes encountered in the seawater feed to desalination plants. In the presence of air and ammonia, aluminum brass is subject to stress corrosion cracking. Aluminum bronze is more resistant, while copper nickel alloys are highly resistant to ammonia stress corrosion cracking. Ammonia also tends to increase the general corrosion rates of copper alloys. Copper nickel alloys have been reported to be three orders of magnitude more resistant than aluminum brass.

Nitrogen-containing compound, such as benzotriazoles, are commonly used as antioxidants and corrosion inhibitors for copper and copper alloys in many environments and applications. The lone electron pairs on the nitrogen will coordinate with the metal substrate and will result in a direct attach in the case of cyanate esters, and a parallel attach in the case of triazines, isocyanurates, and blocked isocyanates by physical absorption. The lone electron pairs of the nitrogens further facilitate the coordination of the nitrogen atoms to the Cu substrates in the event any oxidation occurs to form $Cu^+$ or $Cu^{2+}$ ions or oxides. In the case of the triazines and isocyanurates, the functional group can be any reactive or polymerizable functional group, and preferably is an epoxy, allyl, vinylether, hydroxyl, acrylate or methacrylate group. In the case of the polyfunctional cyanate esters and isocyanates, these groups themselves are homo-polymerizable or are reactive with complementary reactive groups, such as, epoxy, carboxyl, hydroxyl and amine functionalities.

Such nitrogen containing inhibitors, referred to as azoles in the water treatment industry, include the more commonly applied Tolytriazole (TTA), Benzotriazole (BTA), and variations of chemical structure that produce comparable inhibiting films on metal surfaces including 4-(alkyl)substituted benzotriazole and 5-(alkyl)substituted BTA where the alkyl group $(C_nH_{2n+1})$ has n=1 to 18. Note: n=1 for $CH_3$ in tolyltriazole which is a mixture of 4-methylbenzotriazole and 5-methylbenzotriazole. The 5-(n-butyl) benzotriazole which was patented by Betz is an example of n=4 in the n-butyl alkyl group $C_4H_9$.

Use of azoles corrosion inhibitor chemistry for metals is known in evaporative cooling water treatment, often being combined with other inhibitors that rely on control of TDS at lower and less corrosive concentrations by blow down wastage of tower water, and control at neutral pH (i.e., pH between 6.0 pH and 9.0) by use of blow down wastage or acid feed for pH control to limit scale formation. Such systems do not typically control hardness at less than 200 mg/L (as $CaCO_3$) as this condition increases water corrosiveness. Azoles inhibitors have also been used to inhibit corrosion of copper by ammonia/ammonium ion in systems operated within prior art control ranges for pH and TDS. Inhibitor use and consumption by blow down wastage is significant, thus these application are costly and environmentally inefficient.

Use of azoles as corrosion inhibitors to protect metals is known in closed system corrosion inhibition applications. Such applications often combine azoles with other inhibitors used in non-evaporative closed loop systems such as engine cooling systems and closed system cooling loops that have minimal water and inhibitor losses. However, such applications of azoles in closed systems operate without high TDS concentrations in the cooling water since there is no evaporation and concentration of makeup water chemistry. As such, inhibitor use and consumption are limited and their application is cost efficient.

BRIEF SUMMARY

The present invention is directed toward the use of azoles as inhibitors, such as Tolytriazole (TTA), Benzotrialzole (BTA), etc., applied at total residuals of 0.25 mg/L to 200 mg/L or greater (as azoles) in evaporative cooling water applications where cooling water chemistry is operated with high TDS as a result of evaporative water loss and/or use of high TDS source water (greater than 2500 mg/L), with high pH (greater than 9.0) and with low total hardness (less than 200 mg/L as $CaCO_3$) in order to inhibit general and localized corrosion of copper, nickel, zinc, aluminum, their alloys and galvanized coatings that are corroded by ammonia/ammonium ion in evaporative cooling water. Dosage of azoles will be proportional to ammonia/ammonium ion concentration in the cooling water. Preferably, minimum azoles residual would be equal to or greater than the ammonia/ammonium ion concentration to optimize inhibition.

The use of azoles inhibitors as contemplated by this invention also inhibits general and localized corrosion of galvanized coatings, as well as zinc, aluminum, tin, lead, beryllium, various alloys of such metals where their metal oxides are soluble or corroded by high pH water in evaporative cooling water. Dosages of the azole or a mixture of two or more azoles will be proportional to increasing TDS concentration and higher pH level, preferably from 0.5 to 60 mg/L residual.

The use of azoles inhibitors as contemplated by this invention also inhibits general and localized corrosion of carbon steel and steel alloys in evaporative cooling water. Application of azoles corrosion inhibitors in such water chemistry conditions provides synergy of performance with recently applied silica based corrosion inhibitor chemistry, as it compliments the inhibition methods for multiple metals, by reaction with soluble and migratory ion residuals of metals such as copper that are either concentrated from the makeup, scrubbed from dust or particles in the air into the system, or resident from prior corrosion. Such metal inhibition or complex formation with soluble metal ions prevents their contribution to galvanic corrosion processes, and interference with inhibitor film formation or corrosion inhibitor mechanisms that protect metals such as carbon steel and various alloys.

One embodiment of the present invention contemplates a method for inhibiting corrosion of a metallic substance in an aqueous system containing greater than 2500 mg/L TDS and less than 200 mg/L $CaCO3$ wherein said aqueous system derives water from source water. The method includes the steps of elevating and maintaining the pH of the aqueous system such that the aqueous system possesses a pH of approximately 9.0 or greater and adding at least one azoles inhibitor to the aqueous system at a total residual of at least 0.25 mg/L.

The corrosion of the metallic substance may be due to the presence of ammonia and/or ammonium ion, hydroxide ions, chloride ions, or sulfate ions which are at significantly higher concentrations due to evaporative concentration of makeup sources high concentrations of such ions in makeup source water, or introduction of such ions into the cooling water. Thus, such corrosive ion concentrations are typically proportional to higher TDS or pH chemistry control residuals in the cooling water system. The metallic substance may be copper, nickel, aluminum, zinc, tin, lead, beryllium, carbon steel, alloys of such metals, or galvanized coatings of such metals.

The aqueous system may contain greater than 5000 mg/L TDS. The aqueous system may contain less than 100 mg/L $CaCO3$. The source water may come from recycled waste water or municipal waste water.

The pH of the aqueous system may be elevated to and maintained between about 9.3 and about 10.3. The pH in the method may be obtained by using high alkalinity source water or by adding at least one alkaline pH control agent to the aqueous system. The alkaline pH control agent may be sodium hydroxide or sodium carbonate.

The azoles inhibitor may be tolytriazole, benzotriazole, a 4-(alkyl)substituted benzotriazole wherein the alkyl group has the formula CnH2n+1 and n is a number between 1 and 18, or a 5-(alkyl)substituted benzotriazole wherein the alkyl group has the formula CnH2n+1 and n is a number between 1 and 18. In one embodiment, the azoles inhibitor may be added to the aqueous system at a total residual between about 0.5 mg/L and about 60 mg/L.

DETAILED DESCRIPTION

The detailed description set forth below is intended as a description of the presently preferred embodiment of the invention, and it is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

The present invention is directed to the use of azoles as inhibitors to inhibit corrosion for applications in evaporative cooling water systems operating at high concentrations of TDS (greater than 2500 mg/L), elevated pH (greater than 9.0), and with soft water (less than 200 mg/L as $CaCO_3$), where corrosion would be significantly increased for copper, nickel, zinc, aluminum, their alloys and galvanized coatings that are corroded by residuals of ammonia/ammonium ion derived from use of water and waste water makeup sources or cooling system contamination.

The present invention is directed to the use of azoles as inhibitors to inhibit corrosion for applications in evaporative cooling water systems operating at high concentrations of TDS (greater than 2500 mg/L), elevated pH (greater than 9.0), and with soft water (less than 200 mg/L as $CaCO_3$) where the metal oxides of such metals as galvanized coatings, aluminum, zinc, tin lead, beryllium, or their metal alloys would be dissolved or corroded as pH increases to levels greater than pH 9.

For example, Adkinson et al. reported in *Cathodic Delamination of Methyl Methacrylate-Based Dry Film Polymers on Copper*, IBM Jour. Res. Develop., Vol. 29, No. 1, January 1985, p. 29, that the surface activity of copper is controlled by use of azoles inhibitors such as benzotriazole (BTA), as follows: Cuprous oxide is normally a protective surface for copper, but is readily attacked by $Cl^-$, $SH^-$, $OH^-$, $NH_4^+$ and to a lesser extent $CO_2$. BTA and other azoles can affect the properties of cuprous oxide films by stabilizing the film. The copper oxide-BTA layer interferes with the anodic and/or cathodic reactions of the corrosion process. Copper oxide-BTA films will form in an acidic or neutral solution, and the type of film formed is dependent on the pH of the BTA solution. At pH values of 3.5 to 4, thick, shag-carpet like films are formed, while at pH greater than 4, thin, compact, highly protective films are formed. Copper in $NaHCO_3$ solution (pH=8.1) at 25° C. yields a potential of +0.12 V versus the normal hydrogen electrode (NHE), and as found in Pourbaix's diagram in *Atlas of Electrochemical Equilibria in Aqueous Solutions*, $2^{nd}$ Ed., National Association of Corrosion Engineers, Houston, Tex., 1974, for copper, the stable form of copper under these conditions is $Cu_2O$. In fact, Atkinson found that an alkaline pretreatment of copper in $NaHCO_3$ solution prior to BTA application yields a significantly more corrosion-resistant $Cu_2O$-BTA layer than if no pretreatment is used, as measured using potentiodynamic scans in 3000 mg/L NaCl to calculate corrosion rates.

For example, Metikos-Hukovic et al. reports in *Copper Corrosion At Various pH Values with and without Inhibitor*, Journal of Applied Electrochemesitry, 30: 617-624, 2000, that corrosion inhibition of copper by BTA inhibitor provided rapid film formation and was increasingly effective at higher pH (pH=10) in evaluations from pH 4 to 10. Increased BTA concentration also improves corrosion inhibition, but is time and concentration dependent at acid and neutral pH less than 9.

Further to the disclosure reported above by Adkinson and Metikos-Hukovic, we have discovered that application of azoles in evaporative cooling water, where pH is desirably controlled at pH greater than 9, contributes to more rapid and highly protective film formation to protect copper, aluminum, zinc, nickel, their alloys and galvanized coatings from the high concentrations of corrosive ions associated with high TDS/high pH/low hardness cooling water that result from evaporative concentration of normal makeup and/or waste water makeup sources, or cooling water contamination. For example, copper corrosion is generally higher in high TDS water, such as seawater (TDS at 35,000 mg/L, pH 8.0, and calcium hardness at 411 mg/L as Ca ion and magnesium hardness at 1290 mg/L as Mg ion), whereas exceptional copper corrosion rates (less than 0.05 mpy) are obtained with use of azoles in the high TDS water chemistry control conditions specified with this discovery method. The preferred embodiment would be pH range from 9.3 to 10.3 in evaporative cooling water.

For example, Small et al. reported in *Using a Buffered Rinse Solution to Minimize Metal Contamination After Wafer Cleaning*, Ultrapure Materials—Chemicals, Micro Magazine, January 1998, p. 61, as found in a Pourbaix diagram for aluminum, that an oxide layer can protect aluminum from corrosion between pH 4 to 10.3. Thus, aluminum oxide adsorbed (binding) to silicon oxide surfaces is stable and resistant to dissolution and removal. However, application of $NH_4OH$ rinse solution to the silicon oxide surfaces that have adsorbed aluminum oxide (as compared to aluminum metal exposure to ammonia/ammonium ion in cooling water) will form a soluble $Al(OH)_4^-$ species that is stable in solution and thus releases the aluminum metal from the silicon oxide surface; the sodium and calcium metal ions are released by ion exchange as $NH_4^+$ ions compete with the alkali metal ions for surface binding sites. When comparing this result to ineffective removal of such metal sorbs on silicon oxide by DI water, one possible explanation for the desorbing of metal ions is that the adsorbed metal ions require a driving force before they will desorb. Thus, an ionic medium is needed to balance the ionic charges once the cation is in solution. It has also been found that transition metal ion contamination, including zinc, copper, and iron can only effectively be removed from silicon oxide surfaces with ammonium hydroxide and citric acid solutions.

Further to the disclosure reported by Small above, we believe that ammonia/ammonium ions have the ability to penetrate corrosion inhibitor films such as those formed by amorphous silica in evaporative cooling water applications and thus corrode the normally protective metal oxide surfaces of such metals as aluminum, copper, nickel, zinc, their alloys and galvanized coatings. Thus, application of azoles to protect such metals from such corrosive ions is specifically beneficial and synergetic to other inhibitor mechanisms used to protect multi-metal systems operating with high TDS/high pH/low hardness cooling water that result from evaporative concentration of normal makeup and/or waste water makeup sources, or cooling water contamination.

For example, it is also well known in prior water treatment art that galvanized coated steel metal surfaces contacting circulating cooling water should only be exposed to pH maintained in the 6.0 to 8.0 range in the cooling water during start up conditioning to passivate the galvanized surface from white rust and corrosion, and the cooling water chemistry control should not be allowed to exceed pH 9.0 during routine cooling tower operation as reported by Reggiani in *White Rust: an Industry Update and Guide*, Association of Water Technologies, 2002, p. 6, Table 1. The manufacturers of cooling towers using galvanized surface materials specify control within such water chemistry pH control parameters to warranty the equipment. Even with use of environmentally acceptable prior art corrosion inhibitors, including azoles inhibitors, galvanized surfaces are corroded at pH outside this range.

We have discovered that galvanized surfaces can be protected from general and localized corrosion at pH above 9 in evaporative cooling water with addition of azoles at sufficient concentration when applied in combination with amorphous silica inhibitor methods recently being applied to protect carbon steel and other metals at high TDS and high pH water chemistry conditions resulting from reduced blow down and water wastage. Observation of galvanized coating surfaces treated only with the silica inhibitor method chemistry indicated general (cathodic) corrosion inhibition, but still experienced localized (anodic) corrosion typical of the sacrificial multi-metal galvanized coating. Azoles are reported to function as anodic inhibitors that form films at anodic corrosion sites that may form in protective metal oxide films, but may also provide anodic films and synergy with concurrently applied cathodic inhibitor films such as those formed by amorphous silica inhibitor. It is believed that the synergy of this combination of operating chemistry inhibits both anodic and cathodic corrosion in the presence of high TDS, high pH and low hardness cooling water.

Operation of evaporative cooling systems with high TDS and high pH evaporative cooling water chemistry was not previously practical due to corrosiveness of high TDS, particularly with low calcium hardness residuals that are not sufficient to maintain concentrations required for stable corrosive indexes to mitigate corrosiveness of the water. Highly concentrated tower water, with high TDS and high pH, was also not practical due to required control below the solubility limitations of silica and hardness necessary to prevent scale deposition.

Recent application of corrosion and scale inhibition methods as disclosed by Duke in U.S. Pat. Nos. 6,929,749; 6,940,193; 6,998,092; and 7,122,148 permit evaporative cooling water operation at/or approaching zero liquid discharge, with high TDS/high pH/low hardness water chemistry and facilitates efficient application of azoles inhibitor residuals and synergy of corrosion inhibitor mechanisms to protect multiple metals in high TDS/high pH/low hardness system water chemistry. We have discovered that application of azoles corrosion inhibitors in such water chemistry conditions also provides synergy of performance with this recent silica based corrosion inhibitor chemistry, as it compliments the inhibitor process for multiple metals in the presence of either high pH or ammonia/ammonium ions, and also functions by reaction with soluble ions of metals such as copper, either concentrated from the makeup or through contaminants scrubbed into the system from the air, that interfere with the inhibitor film or corrosion inhibitor mechanisms that protect metals such as carbon steel and it's alloys.

The novel method, which may combine total azoles inhibitor residuals from 0.25 mg/l to 200 or greater mg/L active azoles residual, specifically benefits applications in evaporative cooling water contacting heat transfer surfaces where use of soft makeup water permits increased evaporative concentrations without hardness scales, where pH is controlled at levels greater than 9.0, soluble polyvalent metal ion concentrations are controlled below 200 mg/L (as $CaCO_3$) and are exceeded by monovalent metal ion (sodium) concentrations in cooling water, and method controls where silica monomer is polymerized to provide complimentary synergy in corrosion and scale inhibition.

Specifically, this discovery provides previously unknown efficiency and effectiveness with application of azoles inhibitor chemistry via limited azoles inhibitor consumption, typically at less than 5% of prior art quantities consumed and at least 50% less than all prior art applications, when compared to prior art methods which rely on high blow down wastage to reduce scale and corrosion. The present invention also reduces quantity of azoles (organics) discharged to waste processing and/or their potential environmental impact by minimum of 75%, and up to 99% reduction. The present invention further permits economical use of higher azoles inhibitor residuals, as a result of reduced wastage, which provides more effective corrosion inhibition (comparable to higher azoles residuals used in closed, non evaporative, cooling systems). The present invention also permits increased water reuse from sources such as waste waters, grey water, municipal reclaimed sewage, high TDS source water and others that contain ammonia/ammonium ion, high TDS residuals, corrosive ions and organics that have limited the use of such water sources due to excessive corrosion and/or excessive corrosion inhibitor treatment costs to mitigate corrosion from such makeup water sources when used in critical cooling system components constructed with copper, nickel, aluminum, zinc, tin, lead, beryllium, carbon steel, various alloys of such metals and galvanized coatings commonly employed for heat transfer and transport (circulation) of water in evaporative cooling systems.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods of the present inventions within the spirit and scope of the invention. In addition, such modifications may include, for example, using other conventional water treatment chemicals along with the methods of the present invention, and could include various other corrosion inhibitors such as for example amorphous silica or silicates, phosphates, organic phosphonates or polymers, as well as dispersants, biocides and defoamers and the like. Accordingly, the present invention should be construed as broadly as possible.

As an illustration, non-restrictive examples are provided below of evaporative cooling water and systems that have been treated with methods conforming to the present invention.

Method Experimental Examples:

Experiment 1

Testing was conducted using zero liquid discharge (ZLD) evaporative cooling water from a cooling tower system operating with water chemistry residuals of 83,000 mg/L TDS, pH 10.1, 70 mg/L total hardness (as $CaCO_3$), 1200 mg/L chloride, 6500 mg/L sulfate, 490 mg/L soluble silica (as $SiO_2$), and 0.7 mg/L copper. Two sample solutions were prepared in 200 ml glass sample jars with lids from the sample water.

Test Water Sample #1: One 3 inch long by 0.5 inch wide copper (Cu 1100) metal coupon was totally submerged in a 200 ml sample of the silica inhibited test solution in a glass container, and capped to prevent gain or loss of gasses. The test sample solution was measured for copper residual after 48 hours, which did not increase from the original sample residual of 0.7 mg/L as copper measured by the Hach Colorimeter and test Method 8506. This step also provided time for a silica inhibition film to form on the copper coupon. Ammonium hydroxide was then added to the sample to establish a residual of 300 mg/L ammonia/ammonium ion as measured by Chemetrics test procedure K-1500. A sample of the test solution was retested for copper after 48 hours and found to have a 40 mg/L soluble copper residual, indicating corrosive attack of the copper by ammonia/ammonium ion in the silica inhibited water (Table 1).

Test Water Sample #2: One 3 inch long by 0.5 inch wide copper (Cu 1100) metal coupon was totally submerged in a 200 ml sample of the silica inhibited test solution in a glass container, and capped to prevent gain or loss of gasses. The test sample solution was measured for copper residual after 48 hours, which did not increase from the original sample residual of 0.7 mg/L as copper measured by the Hach Colorimeter and test Method 8506. This step also provided time for a silica inhibition film to form on the copper coupon. Tolytriazole (TTA) was then added to this sample to establish a residual of 200 mg/L azoles (as TTA) by Hach test procedure 730. Ammonium hydroxide was then added to the sample to establish a residual of 300 mg/L ammonia/ammonium ion as measured by Chemetrics test procedure K-1500. A sample of the test solution was retested for copper after 48 hours and found to have a 0.7 mg/L soluble copper residual (no increase), indicating inhibition of corrosive attack of the copper by ammonia/ammonium ion with the addition of the azoles inhibitor TTA (Table 1).

TABLE 1

|  | NH4+, mg/L | TTA, mg/L | Cu, mg/L |
|---|---|---|---|
| Sample # 1 | 0 | 0 | 0.7 |
| Beginning | 300 | 0 | 0.7 |
| After 48 hours | 300 | 0 | 40 |
| Sample # 2 | 0 | 0 | 0.7 |
| Beginning | 300 | 200 | 0.7 |
| After 48 hours | 300 | 200 | 0.7 |

Experiment 2

Testing was conducted in a zero liquid discharge (ZLD) evaporative cooling water system with cooling tower system chemistry operating at 28,000 mg/L TDS, pH 9.9, 20 mg/L total hardness (as $CaCO_3$), 450 mg/L chloride, 2100 mg/L sulfate, 550 mg/L soluble silica (as $SiO_2$), and 0.3 mg/L copper. No appreciable change in the above measured chemical residuals occurred (retested at the end of the study) in the tower water throughout the 120 days of testing exposure for test coupons #1 and #2. An apparatus for exposing 3 inch by 0.5 inch galvanized metal coated carbon steel test coupons was installed to provide continuous cooling water flow past all coupon surfaces.

Test Coupon #1

The first galvanized coated carbon steel test coupon #233 was installed for 60 days exposure to the ZLD cooling system water. The exposed galvanized surface (coupon #233) experienced localized corrosion (pitting), as compared to the unexposed #232 control coupon. Removal of the galvanized coating (acid striped) shows the exposed #233 coupon experienced localized corrosion (pitting) that extended through the galvanized coating, with penetration to the carbon steel subsurface.

Test Coupon #2

The second galvanized coated carbon steel coupon #234 was installed for 60 days after addition of 100 mg/L of the azole Tolytriazole (as TTA), as measured by Hach test procedure 730, to the same ZLD cooling system water. The galvanized surface of #234 test coupon did not experience localized corrosion (pitting) with the azoles treated high pH/high TDS/low hardness cooling water.

What is claimed is:

1. A method for inhibiting corrosion of a metallic substance in an aqueous system, wherein said metallic substance is selected from the group consisting of copper, nickel, aluminum, zinc, tin, lead, beryllium, carbon steel, alloys of the metallic substance, and galvanized coatings of the metallic substance, comprising the steps:

a. providing source water to derive said aqueous system, said aqueous system containing greater than 2500 mg/L TDS and less than 200 mg/L CaCO3, and corrosive ammonia and/or ammonium ions;

b. elevating and maintaining the pH of said aqueous system such that said aqueous system possesses a pH of approximately 9.0 or greater, wherein said aqueous system contains an amorphous silica corrosion inhibitor, and said ammonia and/or ammonium ions have the ability to penetrate a corrosion inhibitor film formed by the amorphous silica corrosion inhibitor; and c. adding at least one azoles inhibitor to said aqueous system at a total residual of at least 0.25 mg/L, to inhibit corrosion of said metallic surface.

2. The method of claim 1 wherein in the corrosive ions further comprise hydroxide ions.

3. The method of claim 1 wherein in the corrosive ions further comprise chloride ions.

4. The method of claim 1 wherein the corrosive ions further comprise sulfate ions.

5. The method of claim 1 wherein the metallic substance is copper.

6. The method of claim 1 wherein the aqueous system contains greater than 5000 mg/L TDS.

7. The method of claim 1, wherein the aqueous system contains less than 100 mg/L $CaCO_3$.

8. The method of claim 1 wherein in step a) the source water is selected from the group consisting of recycled waste water and municipal waste water.

9. The method of claim 1 wherein in step a) the pH of the aqueous system is elevated to and maintained between about 9.3 and about 10.3.

10. The method of claim 1 wherein the pH of greater than 9.0 is obtained by using high alkalinity source water in step a).

11. The method of claim 1 wherein the pH of greater than 9.0 is obtained by adding at least one alkaline pH control agent to the aqueous system in step a).

12. The method of claim 11 wherein the alkaline pH control agent is selected from the group consisting of sodium hydroxide and sodium carbonate.

13. The method of claim 1 wherein the azoles inhibitor is tolytriazole.

14. The method of claim 1 wherein the azoles inhibitor is benzotriazole.

15. The method of claim 1 wherein the azoles inhibitor is 4-(alkyl)substituted benzotriazole wherein the alkyl group has the formula $C_nH_{2n+1}$ and n is a number between 1 and 18.

16. The method of claim 1 wherein the azoles inhibitor is 5-(alkyl) substituted benzotriazole wherein the alkyl group has the formula $C_nH_{2n+1}$ and n is a number between 1 and 18.

17. The method of claim 1 wherein the azoles inhibitor is added to the aqueous system in step c) at a total residual between about 0.5 mg/L and about 60 mg/L

* * * * *